United States Patent
Wu et al.

(10) Patent No.: US 9,420,533 B2
(45) Date of Patent: Aug. 16, 2016

(54) DISCONTINUOUS RECEPTION

(75) Inventors: Chunli Wu, Beijing (CN); Benoist Pierre Sebire, Tokyo (JP); Lei Du, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 57 days.

(21) Appl. No.: 14/348,712

(22) PCT Filed: Sep. 30, 2011

(86) PCT No.: PCT/CN2011/001658
§ 371 (c)(1),
(2), (4) Date: Mar. 31, 2014

(87) PCT Pub. No.: WO2013/044415
PCT Pub. Date: Apr. 4, 2013

(65) Prior Publication Data
US 2014/0241227 A1    Aug. 28, 2014

(51) Int. Cl.
*G08C 17/00* (2006.01)
*H04W 52/02* (2009.01)
*H04W 76/04* (2009.01)

(52) U.S. Cl.
CPC ...... *H04W 52/0209* (2013.01); *H04W 52/0216* (2013.01); *H04W 76/048* (2013.01)

(58) Field of Classification Search
CPC ............... H04W 52/0209; H04W 52/0216; H04W 76/048
See application file for complete search history.

(56) References Cited

U.S. PATENT DOCUMENTS

| | | | |
|---|---|---|---|
| 2008/0248840 | A1 | 10/2008 | Kim et al. |
| 2008/0285509 | A1* | 11/2008 | Womack et al. .............. 370/329 |
| 2009/0232054 | A1* | 9/2009 | Wang ................ H04W 52/0225 370/328 |
| 2009/0232118 | A1* | 9/2009 | Wang et al. ................... 370/338 |
| 2009/0238098 | A1* | 9/2009 | Cai et al. ....................... 370/254 |
| 2009/0285141 | A1* | 11/2009 | Cai et al. ....................... 370/311 |
| 2010/0110897 | A1* | 5/2010 | Chun et al. .................... 370/241 |
| 2010/0118815 | A1* | 5/2010 | Kim et al. ..................... 370/329 |
| 2011/0183663 | A1* | 7/2011 | Kenehan ............ H04W 76/048 455/423 |
| 2011/0199910 | A1 | 8/2011 | Oh et al. |

(Continued)

FOREIGN PATENT DOCUMENTS

| | | |
|---|---|---|
| CN | 101534544 A | 9/2009 |
| CN | 102143565 A | 8/2011 |
| JP | H0983427 A | 3/1997 |

(Continued)

OTHER PUBLICATIONS

3GPP TS 36.321 V12.0.0 (Dec. 2013), "3$^{rd}$ Generation Partnership Project; Technical Specification Group Radio Access Network; Evolved Universal Terrestrial Radio Access (E-UTRA); Medium Access Control (MAC) protocol specification (Release 12)", 57 pgs.

(Continued)

*Primary Examiner* — Clemence Han
(74) *Attorney, Agent, or Firm* — Harrington & Smith (57) ABSTRACT

A method may be provided. The method may include selecting one of a first discontinuous cycle of a first length and a second discontinuous reception cycle of a second length. The second discontinuous reception cycle may be of a different length to the first cycle. Both of the first and second cycles may be available for selection. The method may further include using said selected cycle.

39 Claims, 6 Drawing Sheets

(56) References Cited

U.S. PATENT DOCUMENTS

| | | |
|---|---|---|
| 2012/0176950 A1 | 7/2012 | Zhang et al. |
| 2013/0128790 A1 | 5/2013 | Futaki et al. |

FOREIGN PATENT DOCUMENTS

| | | |
|---|---|---|
| JP | 2010050969 A | 3/2010 |
| JP | 2010521826 A | 6/2010 |
| JP | 2010521917 A | 6/2010 |
| JP | 2010232707 A | 10/2010 |
| JP | 2011/514787 A | 5/2011 |
| JP | 2011520378 A | 7/2011 |
| JP | 2011166838 A | 8/2011 |
| JP | 2012509649 A | 4/2012 |
| WO | WO 2007/082934 A1 | 7/2007 |
| WO | WO 2010059741 A2 | 5/2010 |
| WO | WO 2011/038625 A1 | 4/2011 |

OTHER PUBLICATIONS

R2-062753; Nokia; "Active mode DRX details"; 3GPP TSG-RAN WGx Meeting #55; Seoul, Korea, Oct. 9-13, 2006.

3GPP TS 36.321 V10.2.0 (Jun. 2011); 3rd Generation Partnership Project; Technical Specification Group Radio Access Network; Evolved Universal Terrestrial Radio Access (E-UTRA); Medium Access Control (MAC) protocol specification (Release 10).

* cited by examiner

DISCONTINUOUS RECEPTION

The present invention relates to an apparatus and method for providing discontinuous reception (DRX) in a communication system.

A communication system can be seen as a facility that enables communication between two or more devices such as user terminals, machine-like terminals, base stations and/or other nodes by providing carriers between the communication devices. A communication system can be provided for example by means of a communication network and one or more compatible communication devices. The communication may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless system at least a part of communications between at least two stations occurs over wireless interfaces. Examples of wireless systems include public land mobile networks (PLMN), satellite based communication systems and different wireless local networks, for example wireless local area networks (WLAN). The wireless systems can typically be divided into cells, and are therefore often referred to as cellular systems. A user can access a communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

A communication system and associated devices typically operate in accordance with a given standard or specification which sets out what the various entities associated with the system are permitted to do and how that should be achieved. Communication protocols and/or parameters which shall be used for the connection are also typically defined. Examples of standardised radio access technologies include GSM (Global System for Mobile), EDGE (Enhanced Data for GSM Evolution) Radio Access Networks (GERAN), Universal Terrestrial Radio Access Networks (UTRAN) and evolved UTRAN (E-UTRAN). An example of standardized communication system architectures is the long-term evolution (LTE) of the Universal Mobile Telecommunications System (UMTS) radio-access technology. The LTE is being standardized by the 3rd Generation Partnership Project (3GPP). The LTE employs the Evolved Universal Terrestrial Radio Access Network (E-UTRAN). The various development stages of 3GPP specifications are referred to as releases. Further developments of LTE are sometimes referred to as LTE Advanced (LTE-A).

A discontinuous reception (DRX) mode is supported e.g. in the long term evolution (LTE) of 3GPP standards. DRX is typically utilised to conserve battery power of devices, to save on wireless resources, and to increase overall system capacity.

According to a first aspect, there is provided a method comprising: selecting one of a first discontinuous cycle of a first length and a second discontinuous reception cycle of a second, different length, both of said first and second cycles being available for selection; and using said selected cycle.

According to a second aspect, there is provided a method comprising: selecting one of a first discontinuous cycle of a first length and a second discontinuous reception cycle of a second, different length, both of said first and second cycles being available for selection; and sending information on said selected cycle to a user equipment.

According to a third aspect, there is provided a computer program comprising computer executable instructions which when run are configured to perform the method of the first or second aspect.

According to a fourth aspect, there is provided an apparatus, said apparatus comprising at least one processor and at least one memory including computer program code, the at least one memory and computer program code configured to with the at least one processor cause the apparatus at least to: select one of a first discontinuous cycle of a first length and a second discontinuous reception cycle of a second, different length, both of said first and second cycles being available for selection; and use said selected cycle.

According to a fifth aspect, there is provided a user equipment comprising an apparatus according to the fourth aspect.

According to a sixth aspect, there is provided an apparatus for a user equipment, said apparatus comprising at least one processor and at least one memory including computer program code, the at least one memory and computer program code configured to with the at least one processor cause the apparatus at least to: select one of a first discontinuous cycle of a first length and a second discontinuous reception cycle of a second, different length, both of said first and second cycles being available for selection; and send information on said selected cycle to a user equipment.

According to a seventh aspect, there is provided a base station comprising an apparatus according to the sixth aspect.

Various other aspects and further embodiments are also described in the following detailed description of examples and in the attached claims.

Embodiments will now be described in further detail, by way of example only, with reference to the following examples and accompanying drawings, in which.

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

Figure 1:
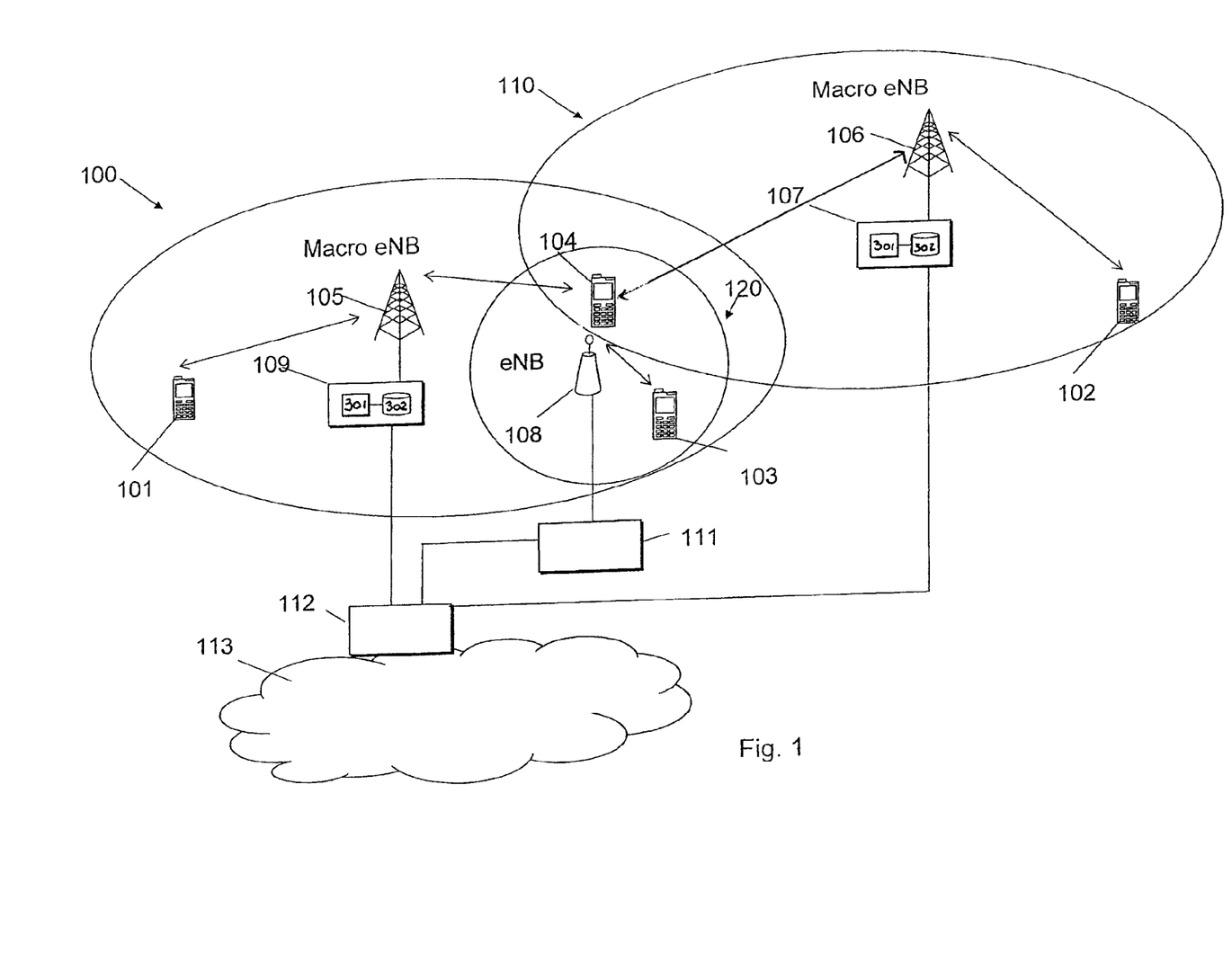
FIG. 1 shows a schematic diagram of a network according to some embodiments.

A mobile communication device or user equipment 101, 102, 103, 104 is typically provided wireless access via at least one base station or similar wireless transmitter and/or receiver node of an access system. In FIG. 1 three neighbouring and overlapping access systems or radio service areas 100, 110 and 120 are shown being provided by base stations 105, 106, and 108.

However, it is noted that instead of three access systems, any number of access systems can be provided in a communication system. An access system can be provided by a cell of a cellular system or another system enabling a communication device to access a communication system. A base station site 105, 106, 108 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. Each mobile communication device 101, 102, 103, 104, and base station 105, 106, and 108 may have one or more radio channels open at the same time and may send signals to and/or receive signals from more than one source.

Base stations 105, 106, 108 are typically controlled by at least one appropriate controller apparatus 109, 107 so as to enable operation thereof and management of mobile communication devices 101, 102, 103, 104 in communication with the base stations 105, 106, 108. The control apparatus 107, 109 can be interconnected with other control entities. The control apparatus 107 or 109 can typically be provided with memory capacity 301 and at least one data processor 302. The control apparatus 109 and functions may be distributed between a plurality of control units. Although not shown in FIG. 1 in some embodiments, each base station 105, 106 and 108 can comprise a control apparatus 109, 107.

The cell borders or edges are schematically shown for illustration purposes only in FIG. 1. It shall be understood that the sizes and shapes of the cells or other radio service areas may vary considerably from the similarly sized omni-directional shapes of FIG. 1.

In particular, FIG. 1 depicts two wide area base stations 105, 106, which can be macro-eNBs 105, 106. The macro-eNBs 105, 106 transmit and receive data over the entire coverage of the cells 100 and 110 respectively. FIG. 1 also shows a smaller base station or access point which in some embodiments can be a pico eNB 108. The coverage of the smaller base station 108 may generally be smaller than the coverage of the wide area base stations 105, 106. The coverage provided by the smaller node 108 overlaps with the coverage provided by the macro-eNBs 105, 106. In some embodiments, the smaller node can be a femto or Home eNB. Pico eNBs can be used to extend coverage of the macro-eNBs 105, 106 outside the original cell coverage 100, 110 of the macro-eNBs 105, 106. The pico eNB can also be used to provide cell coverage in "gaps" or "shadows" where there is no coverage within the existing cells 100, 110 and/or may serve "hot spots".

As shown, the radio service areas can overlap. Thus signals transmitted in an area can interfere with communications in another area (macro to macro and pico to either one or both of the macro cells).

It should be noted that in some embodiments the pico eNB or smaller eNBs may not be present. In alternative embodiments, only pico or smaller eNBs may be present. In some embodiments there may be no macro eNBs.

The communication devices 101, 102, 103, 104 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

Some non-limiting examples of the recent developments in communication systems are the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

In FIG. 1 the base stations 105, 106, 108 of the access systems can be connected to a wider communications network 113. The controller apparatus 107, 109 may be provided for coordinating the operation of the access systems. A gateway function 112 may also be provided to connect to another network via the network 113. The smaller base station 108 can also be connected to the other network by a separate gateway function 111. The base stations 105, 106, 108 can be connected to each other by a communication link for sending and receiving data. The communication link can be any suitable means for sending and receiving data between the base stations 105, 106 and 108 and in some embodiments the communication link is an X2 link.

The other network may be any appropriate network. A wider communication system may thus be provided by one or more interconnect networks and the elements thereof, and one or more gateways may be provided for interconnecting various networks.

Figure 2:
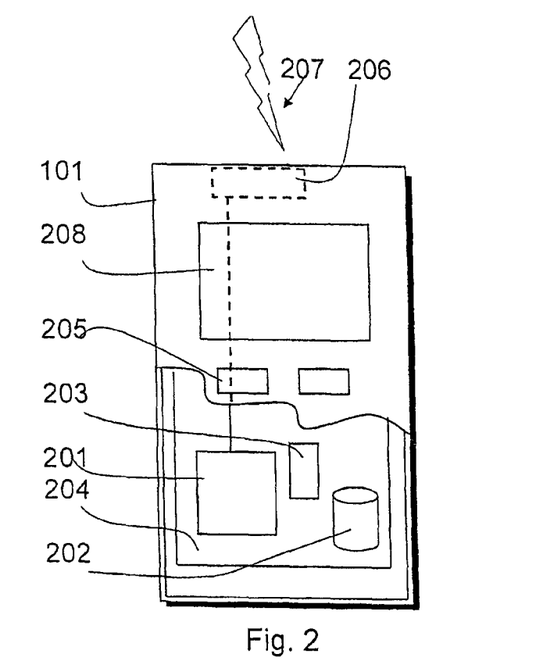
FIG. 2 shows a schematic diagram of a mobile communication device according to some embodiments.

The mobile communication devices will now be described in more detail in reference to FIG. 2. FIG. 2 shows a schematic, partially sectioned view of a communication device 101 that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. A user may also be provided broadcast or multicast data. Non-limiting examples of the content include downloads, television and radio programs, videos, advertisements, various alerts and other information.

The mobile device 101 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Figure 3:
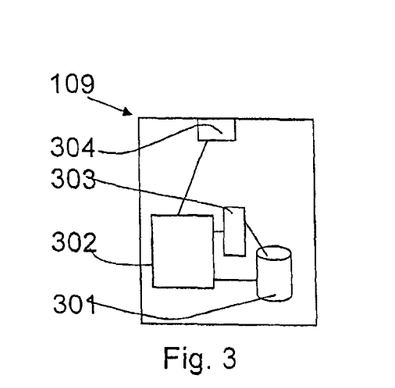
FIG. 3 shows a schematic diagram of a control apparatus according to some embodiments.

FIG. 3 shows an example of a control apparatus 109 for a communication system, for example to be coupled to and/or for controlling a station of an access system. In some embodiments the base stations 105, 106, and 108 may incorporate a control apparatus 109. In other embodiments the control apparatus can be another network element. The control apparatus 109 can be arranged to provide control of communications by mobile communication devices that are in the service area of the system. The control apparatus 109 comprises at least one memory 301, at least one data processing unit 302, 303 and an input/output interface 304. Via the interface the control apparatus can be coupled to a receiver and a transmitter of the base station. The control apparatus 109 can be configured to execute an appropriate software code to provide the control functions.

Figure 4:
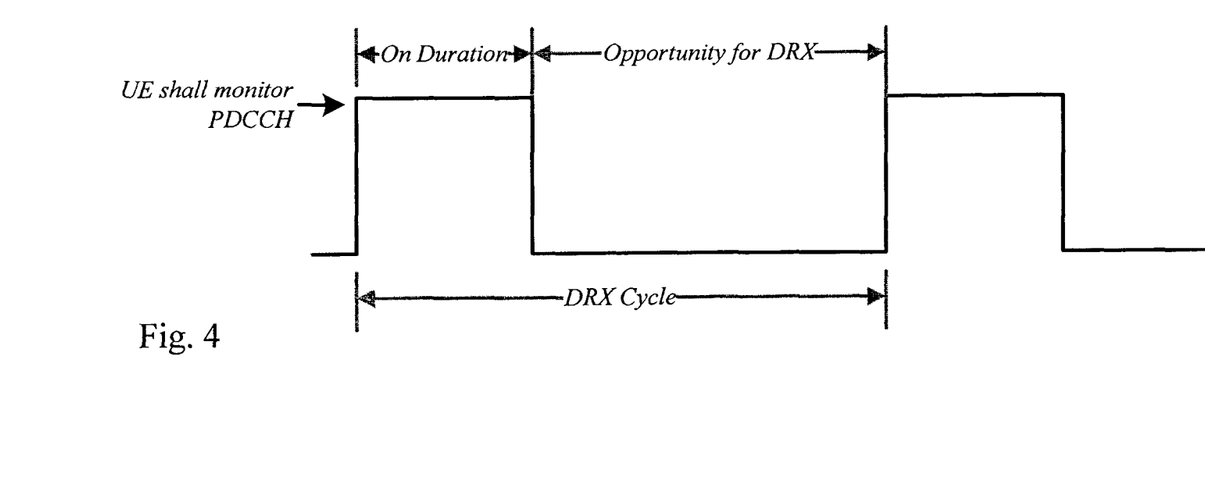
FIG. 4 shows an example of a DRX cycle.

An example of a DRX cycle is shown in FIG. 4. As shown, the cycle contains active (On duration) and non-active (opportunity for DRX) periods. A communication device shall monitor for a control channel during the active period.

In release 8 (Rel-8) to release 10 (Rel-10) of E-UTRAN, a mechanism for DRX has been specified which has long and short DRX cycles. If both short and long DRX cycles are available, the short DRX cycle must first be used. The short DRX cycle will be used on expiry of an inactivity timer. The inactivity timer is started or restarted by the scheduling of a new downlink assignment/uplink grant. At the same time a short cycle timer, the drxShortCycleTimer is started or restarted. A long DRX cycle will be used at the expiry of the drxShortCycleTimer. In other words, a long cycle can only be used when the DRX short cycle timer has expired.

By way of example, possible values for the short DRX: sf2, sf5, sf8, sf10, sf16, sf20, sf32, sf40, sf64, sf80, sf128, sf160, sf256, sf320, sf512, sf640; and for the long cycle: sf10, sf20, sf32, sf40, sf64, sf80, sf128, sf160, sf256, sf320, sf512, sf640, sf1024, sf1280, sf2048, sf2560. (sf=subframe). The long cycle is multiple time of the short cycle.

With the Rel 8 to Rel 10 versions of the standard, where a short cycle is not configured, a long cycle will be used. The Rel 8 to 10 discussions of the DRX mode can be found in the 3GPP TS 36.321.

However, the arrangements specified in Rel 8 to Rel 10 have the consequence that for example in a multi-bearer configuration, when the data transmission is delay tolerant the short DRX cycle must be followed by the long DRX cycle. The delay tolerant data may be provided on logical channels. In this situation, the long DRX cycle may be appropriate but as defined in Rel 8 to Rel 10, it is necessary for the short DRX cycle to be followed by the long DRX cycle if both are configured. Thus, the short DRX cycle must be followed for the duration of the DRX short cycle timer for every new packet transmitted. Thus, even when the user equipment knows that the user equipment has nothing left to transmit, the user equipment has to follow this short DRX cycle for the duration of the DRX short cycle timer. The UE is unable to keep on using the long DRX cycle following new data transmission if the short DRX cycle is configured. This may increase the PDCCH (physical downlink control channel) monitoring unnecessarily and drain the battery.

In some embodiments, both the short and long DRX cycle are available for selection. In other words the long and short DRX cycles are configured. Either cycle can be selected, independently of the other. The short cycle can be selected or the long cycle can be selected. Selection of the long cycle does not rely on either the short cycle having previously been selected or the short cycle not having being configured and thus unavailable for selection.

In one embodiment, an eNB selects which of the short and long cycles is to be used. The eNB will send the information as to which of the short and long cycles is to be used to the user equipment.

Alternatively or additionally, the user equipment can select which of the short or long cycles to use. The user equipment may signal this information to the base station. In one embodiment, the user equipment will use this selected DRX cycle after an acknowledgment has been received from the eNB. This is without requiring the UE to use the configured short DRX cycle first.

Alternatively or additionally, the user equipment will select the long DRX cycle after sending an empty BSR (buffer status register) and receiving an acknowledgement from the eNB. This is without requiring the UE to use the configured short DRX cycle first.

Figure 5:
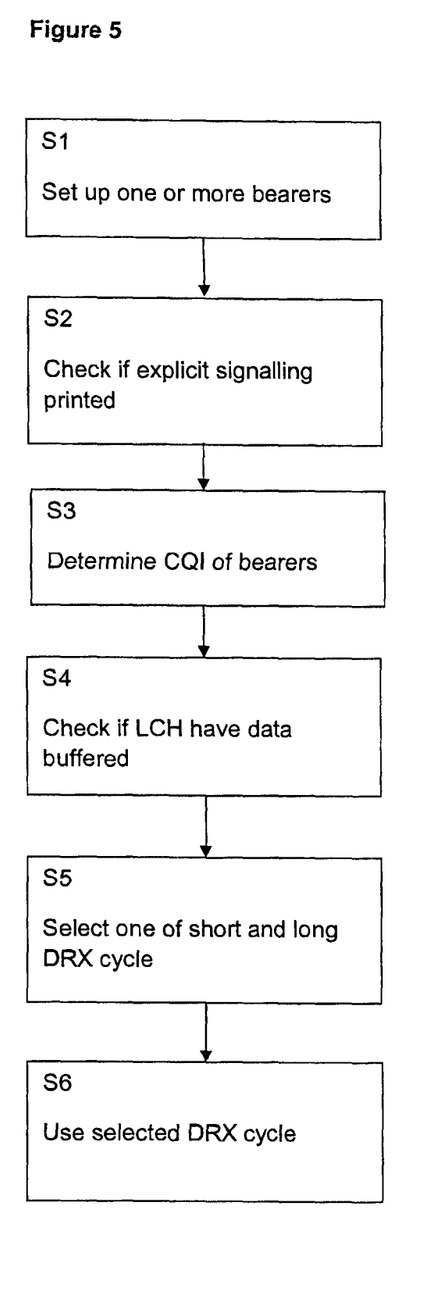
FIG. 5 shows a first method of an embodiment.

Reference will now be made to FIG. 5 which shows a method of an embodiment. In step S1, one or more bearers are set up. This will involve communication between the user equipment and the eNB.

In step S2, a check is made to see if explicit signalling for the selection of a long or a short DRX is made. If so, the method shown in FIG. 5 will be proceeded with.

In step S3, the QCI (Quality of Service Class Identifier) is determined for each bearer. This may be specified by the eNB, by the user equipment or be as a result of communication between the eNB and the user equipment. In some embodiments, a higher node such as a radio network controller may determine the QCI or be involved in the determination of the QCI. Alternatively or additionally, for a UE initiated approach, the eNB may configure, if certain LCHs have data buffered, for the choosing of a short cycle and otherwise to choose the long cycle. This may make QCI invisible in the AS (Access Stratum) of the UE.

In step S4, a check is made to see if a logical channel LCH has data buffered for transmission. This check is made at the user equipment.

In step S5, one of the short and long DRX cycles is selected. The selection of one of the short and long DRX cycles will be dependant of the QCI of a bearer and if the LCH has any data buffered. In one embodiment, only delay tolerant LCH which have data for transmission will use a long cycle. If for example the LCH which has data buffered for transmission is not delay tolerant, then the short cycle will be used. Alternatively, if there is no data buffered for transmission, then the long cycle can be used.

In step S6, the selected DRX cycle is used.

In one embodiment, in step S5, the user equipment will signal to the eNB indicating the selected one of the short and long DRX cycles. The user equipment will responsive to an acknowledgement signal from the eNodeB go to step S6.

In one embodiment, one of step S2 and step S3 may be omitted. In another embodiment, both of these steps may be omitted.

In an UE initiated approach, it is possible for the eNB to configure, if certain LCHs have data buffered, to choose the short cycle, otherwise choose long, etc. This may make the QCI invisible in AS of the UE.

Figure 6:
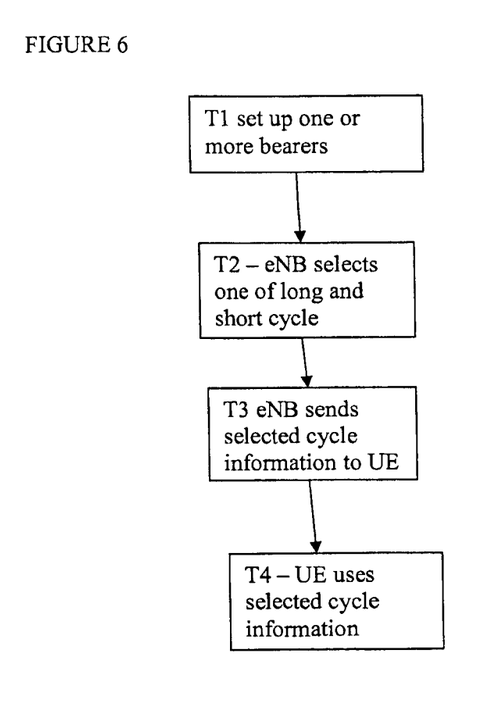
FIG. 6 shows a second method of an embodiment.

Reference is now made to FIG. 6 which shows another embodiment

In step T1, one or more bearers are set up.

In step T2, the eNB selects one of the long and short cycle. The eNB may make the decision based on any suitable criteria. For example, the eNB could decide according to DL data, BSR from the UE, on LCH (logic channel), on the type of channel being established, on the establishment cause e.g. delay tolerant access, and/or depending on UE configuration e.g. EAB (extended access class barring). It should be appreciated that in some embodiments where the UE selects the cycle, one or more of these criteria may be used by the UE.

In step T3, the eNodeB sends the selected cycle information to the user equipment.

In step T4, the user equipment uses the selected DRX cycle.

The method of FIG. 6 may include, as with the method of FIG. 5 a check to see if implicit signalling is disabled. The eNodeB can use any suitable criteria for selecting the long or short cycle. For example, the long or short cycle may be dependent on the delay tolerance of a particular logic channel.

Figure 7:
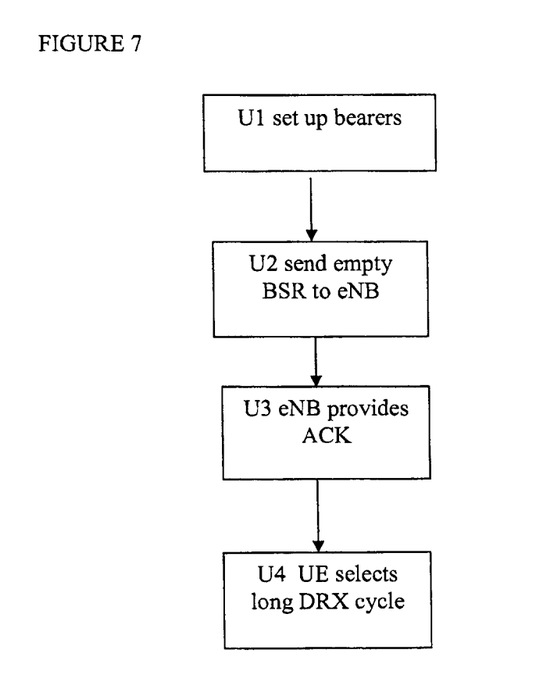
FIG. 7 shows a third method of an embodiment.

Reference is made to FIG. 7 which shows another method of an embodiment.

In step U1, the one or more bearers is set up.

In step U2, the UE sends an empty BSR (buffer status report) to the eNB.

In step U3, the base station sends an acknowledgement which is received by the UE.

In step U4, responsive to this acknowledgement the UE selects the long DRX cycle.

The base station may configure which logic channels LCH are delay tolerant or not and hence those LCH which have no data buffered are to use a long or short cycle.

In the above embodiments, the steps may take place in a different order to that shown.

Some embodiments may be performed after the one or more bearers have been set up for some time. This may mean that one or more of the steps shown in any of FIGS. 5 to 7 may be omitted.

It should be appreciated that alternative rules can be defined for choosing between short and long DRX cycle, other than those mentioned previously.

It should be appreciated that some further embodiments may comprise one or more of the steps of one or more of the different methods discussed above.

In some embodiments, a user equipment may be configured to be backwards compatible. In other words, a user equipment may operate in accordance with embodiments and in some modes of operation be compatible with the Rel 8 to 10 standard. This may be controlled by the eNodeB through radio resource control RRC signalling.

In one embodiment, the eNodeB is configured to send a radio resource reconfiguration message. One or more bits may be added or used in that configuration message to indicate if legacy DRX operation, as defined in release 8 to 10 is being used or whether embodiments are being used.

In embodiment one or more bits are provide in the DRX configuration part of the RRC reconfiguration message. It should be appreciated that this is by way of example only and information which is to be communicated between the base station and the UE can be provided in any suitable one or messages and in any suitable format.

Where the base station explicitly signals the cycle to be used and/or where the UE suggests the cycle to be used, the one or more bits in the message may cause the disabling of switching between Short and Long DRX cycle upon the short timer (drxShortCycleTimer) expiry. The UE may not maintain the short cycle timer (drxShortCycleTimer). The UE may not autonomously switch to the short cycle (as currently required by Rel 8 and 10) when the inactivity timer (InactivityTimer) expire or when a DRX Command MAC control element is received. The DRX cycle switching may only occur when explicitly signalled by the eNB and/or UE.

In some embodiments a MAC CE (control element) may be provided to indicate which cycle to be used for the following period. If for example, the MAC CE is from UE to eNB to suggest the DRX cycle, the acknowledgement from eNB could be an HARQ ACK or a MAC CE to indicate the DRX cycle. This could acknowledge the suggestion or indicate a different cycle.

Some embodiments may work on top of the current DRX operation. The explicit signalling could be used to change cycles when the UE is operating in Short or Long cycle according to current operation. The operation of other DRX timers apart from those mentioned may not change. Where the UE goes directly to the long cycle after sending the empty BSR and receiving the acknowledgement, the one or more bits in the message indicates that the UE is allowed to directly go to the long DRX cycle after sending an empty BSR and receiving an acknowledgement ACK from the eNB. This may be configured by RRC to allow this long cycle after empty BSR In some embodiment, more than two cycles may be configured. In other words there may be additional cycles to the long and short cycles, currently defined. The additional cycles would have different lengths.

Some embodiments may introduce more flexible control of the switching between Short and Long DRX cycles. This may provide more aggressive DRX configurations with less UE power consumption. A simpler, cleaner and more robust DRX operation may be provided.

The required data processing apparatus and functions of a network control apparatus, a communication device and any other appropriate node or element may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method comprising:
    selecting one of a first discontinuous reception cycle of a first length and a second discontinuous reception cycle of a second, different length, both of said first and second cycles being available for selection, wherein each of the first and second cycles is selectable independently of the other of the first and second cycles, and wherein said selecting comprises selecting a longer of said first and second cycles responsive to determining at least one of the following: no data is being buffered to be sent to a base station, and any data being buffered to be sent to a base station is tolerant of a delay associated with the longer of said first and second cycles; and
    using said selected cycle.

2. A method as claimed in claim 1, wherein said selecting comprises receiving information from a base station defining which of said first and second cycles is to be used.

3. A method as claimed in claim 1, wherein said selecting comprises selecting in a user equipment which of said first and second cycles is to be used.

4. A method as claimed in claim 3, comprising causing information about which of said first and second cycles has been selected to be sent to a base station.

5. A method as claimed in claim 4, comprising using said cycle selected in said user equipment responsive to an acknowledgement received from said base station.

6. A method as claimed in claim 1, wherein said selecting is responsive to sending no data is buffered information to the base station and receiving of an acknowledgement.

7. A method as claimed in claim 6, wherein said selecting comprises selecting the longer cycle responsive to sending no data is buffered information to the base station and receiving of an acknowledgement.

8. A method as claimed in claim 1, wherein said selecting is dependent on a configured delay tolerance associated with a channel.

9. A method as claimed in claim 1, wherein said selecting is responsive to a quality of service class identifier associated with each established bearer.

10. A method as claimed in claim 1, wherein said first cycle comprises a long cycle and said second cycle comprises a short cycle.

11. A method as claimed in claim 1, wherein said selecting is responsive to information received in a radio resource control configuration message.

12. A method as claimed in claim 11, wherein said information in said radio resource control configuration message is configured to disable implicit switching between said first and second cycles.

13. A method as claimed in claim 1, wherein said selecting is responsive to information received in a medium access control (MAC) control element.

14. A computer program product comprising a non-transitory computer-readable storage medium bearing computer program code embodied therein for use with a computer, the computer program code comprising code for performing the method of claim 1.

15. A method comprising:
    selecting one of a first discontinuous reception cycle of a first length and a second discontinuous reception cycle of a second, different length, both of said first and second cycles being available for selection, wherein each of the first and second cycles is selectable independently of the other of the first and second cycles, and wherein said selecting is dependent on a configured delay tolerance associated with a channel; and
    sending information on said selected cycle to a user equipment.

16. A method as claimed in claim 15, wherein said selecting is responsive to a quality of service class identifier associated with each established bearer.

17. A method as claimed in claim 15, wherein said first cycle comprises a long cycle and said second cycle comprises a short cycle.

18. A method as claimed in claim 15, wherein said sending comprises sending said information in a radio resource control configuration message.

19. A method as claimed in claim 15, wherein said selection is dependent on at least one of downlink (DL) data, buffer status register from the UE, on channel, on a type of channel being established, on an establishment cause and/or UE configuration.

20. An apparatus comprising:
    at least one processor; and
    at least one memory including computer program code, the at least one memory and computer program code configured, with the at least one processor, to cause the apparatus at least to:
    select one of a first discontinuous reception cycle of a first length and a second discontinuous reception cycle of a second, different length, both of said first and second cycles being available for selection, wherein each of the first and second cycles is selectable independently of the other of the first and second cycles, and wherein said selecting comprises selecting a longer of said first and second cycles responsive to determining at least one of the following: no data is being buffered to be sent to a base station, and any data being buffered to be sent to a base station is tolerant of a delay associated with the longer of said first and second cycles; and
    use said selected cycle.

21. An apparatus as claimed in claim 20, wherein the at least one memory and computer program code are further configured, with the at least one processor, to cause the apparatus to select responsive to receiving information from a base station defining which of said first and second cycles is to be used.

22. An apparatus as claimed in claim 20, wherein the at least one memory and computer program code are further configured, with the at least one processor, to cause the apparatus to select in a user equipment which of said first and second cycles is to be used.

23. An apparatus as claimed in claim 22, wherein the at least one memory and computer program code are further configured, with the at least one processor, to cause the apparatus to cause information about which of said first and second cycles has been selected to be sent to a base station.

24. An apparatus as claimed in claim 23, wherein the at least one memory and computer program code are further configured, with the at least one processor, to cause the apparatus to use said cycle selected in said user equipment responsive to an acknowledgement received from said base station.

25. An apparatus as claimed in claim 20, wherein the at least one memory and computer program code are further configured, with the at least one processor, to cause the apparatus to select responsive to sending no data is buffered information to the base station and receiving of an acknowledgement.

26. An apparatus as claimed in claim 20, wherein the at least one memory and computer program code are further configured, with the at least one processor, to cause the apparatus to select the longer cycle responsive to sending no data is buffered information to the base station and receiving of an acknowledgement.

27. An apparatus as claimed in claim 20, wherein the at least one memory and computer program code are further configured, with the at least one processor, to cause the apparatus to select dependent on a configured delay tolerance associated with a channel.

28. An apparatus as claimed in claim 20, wherein the at least one memory and computer program code are further configured, with the at least one processor, to cause the apparatus to select responsive to a quality of service class identifier associated with each established bearer.

29. An apparatus as claimed in claim 20, wherein said first cycle comprises a long cycle and said second cycle comprises a short cycle.

30. An apparatus as claimed in claim 20, wherein the at least one memory and computer program code are further configured, with the at least one processor, to cause the apparatus to select responsive to information received in a radio resource control configuration message.

31. An apparatus as claimed in claim 30, wherein said information in said radio resource control configuration message is configured to disable implicit switching between said first and second cycles.

32. An apparatus as claimed in claim 20, wherein the at least one memory and computer program code are further configured, with the at least one processor, to cause the apparatus to select responsive to information received in a medium access control (MAC) control element.

33. A user equipment comprising an apparatus as claimed in claim 20.

34. An apparatus comprising:
at least one processor; and
at least one memory including computer program code, the at least one memory and computer program code configured, with the at least one processor, to cause the apparatus at least to:
select one of a first discontinuous reception cycle of a first length and a second discontinuous reception cycle of a second, different length, both of said first and second cycles being available for selection, wherein each of the first and second cycles is selectable independently of the other of the first and second cycles, and wherein said selecting is dependent on a configured delay tolerance associated with a channel; and
send information on said selected cycle to a user equipment.

35. An apparatus as claimed in claim 34, wherein the at least one memory and computer program code are further configured, with the at least one processor, to cause the apparatus to select responsive to a quality of service class identifier associated with each established bearer.

36. An apparatus as claimed in claim 34, wherein said first cycle comprises a long cycle and said second cycle comprises a short cycle.

37. An apparatus as claimed in claim 34, wherein the at least one memory and computer program code are further configured, with the at least one processor, to cause the apparatus to send said information in a radio resource control configuration message.

38. An apparatus as claimed in claim 34, wherein the at least one memory and computer program code are further configured, with the at least one processor, to cause the apparatus to select dependent on at least one of downlink (DL) data, buffer status register from the UE, on channel, on a type of channel being established, on an establishment cause and/or UE configuration.

39. A base station comprising an apparatus as claimed in claim 34.

* * * * *